May 12, 1959     T. C. BURNETTE, JR     2,885,872
UNIVERSAL DRIVE COUPLING
Filed Aug. 26, 1958
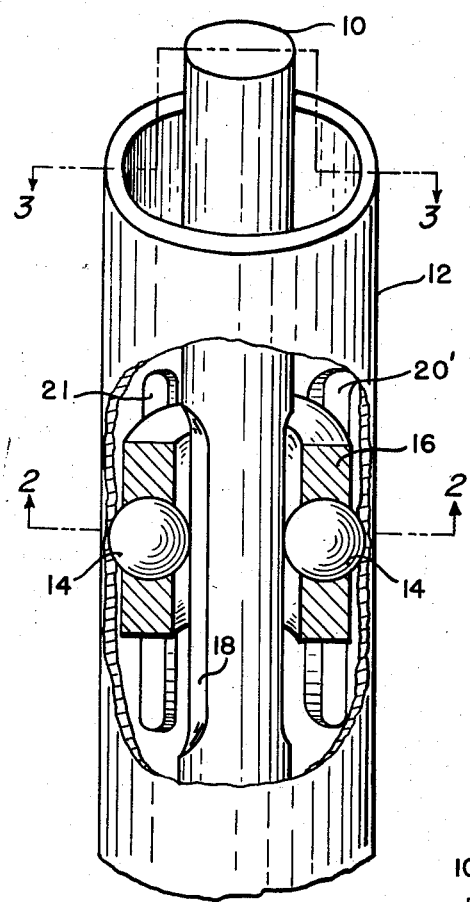
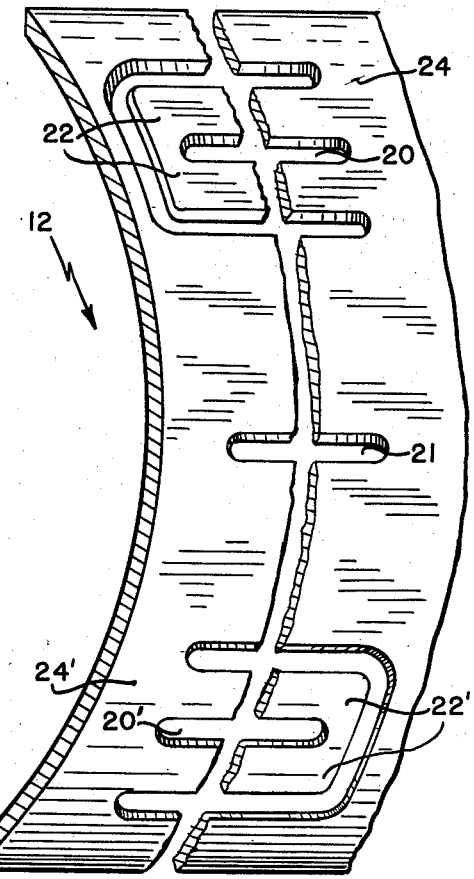
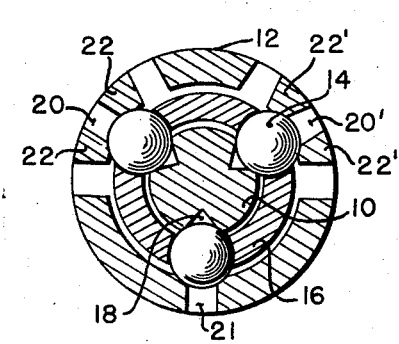
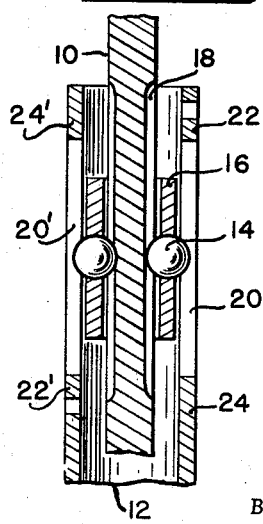
INVENTOR.
THADDEUS C. BURNETTE Jr.
BY
ATTORNEYS

United States Patent Office 2,885,872
Patented May 12, 1959

2,885,872

UNIVERSAL DRIVE COUPLING

Thaddeus C. Burnette, Jr., Swannanoa, N.C., assignor to the United States of America as represented by the Secretary of the Air Force Application August 26, 1958, Serial No. 757,434

5 Claims. (Cl. 64—23)

This invention relates to universal type drive couplings of the constant velocity type employing balls to transmit rotational motion from one shaft to another and free to move in translation, with no backlash and a minimum resistance to sliding friction. It is particularly useful in precision instruments and lends itself to miniaturization.

The conventional splined shaft drive gives rotational motion and sliding motion between members but if the clearance between the splined shaft and splined collar is sufficient to avoid excessive friction in the sliding motion there will be backlash in the rotary motion. If the clearances between splined members is reduced to avoid backlash the friction between members is excessive and the necessary precision machining and assembly of the parts is expensive. There is wear between the splined shaft and collar and repair or replacement is frequently needed to eliminate backlash.

The same difficulties encountered with simple splined couplings develop when balls are substituted for splines unless some means is employed to overcome wear and backlash.

It is an object of this invention to provide a simple and practical means for transmitting rotary motion from one shaft to another with movement in translation.

It is further object to provide said rotary motion without backlash.

It is a further object to provide means for said rotary motion and motion in translation which will automatically compensate for inaccuracies in machining and for wear of the parts.

It is a further object of this invention to provide said rotary motion and motion in translation with a minimum of friction in the sliding motion.

It is a further object to provide a device for the foregoing purposes which can be manufactured using ordinary machining tolerances.

This invention consists essentially of a shaft, which may be considered the driving member, with at least three grooves or slots of a size to accommodate hardened steel balls, such as are found in ball bearings, running lengthwise and parallel to the axis of the shaft. A tubular shaft, which in this case is the driven member, and of a size to move freely over the first shaft, is provided with similarly spaced slots to those in the first shaft except at least two of the grooves or slots are so cut as to form flexible fingers. Balls are then inserted between the two shafts in the slots and held in place by a retainer ring so that any rotary motion of one member is communicated to the other. The pressure of the flexible fingers holds the balls firmly in the slots, prevents backlash and takes up wear automatically. As many slots or grooves as are deemed necessary may be provided and the spring finger slots may be cut in the inner or outer shaft. More than one retainer ring with its complement of balls may be used if desired. While no claim is made for radical angular displacement of the shafts of the driving or driven member it is obvious that a slight misalignment of shafts is possible without strain or damage to the drive which greatly simplifies mounting in the final assembly.

In the drawings:

Figure 1 is a detailed view partly in section;

Figure 2 is a cross sectional view taken along lines 2—2 of Fig. 1;

Figure 3 is a longitudinal section taken through lines 3—3 of Fig. 1; and

Figure 4 is a developed view of the tubular shaft or sleeve showing one method of forming the flexible fingers.

In the drawings a shaft 10, of any suitable material but preferably steel, is shown inside an outer tubular shaft 12, the two shafts being in contact through balls 14. The balls 14 are shown seating in grooves 18 cut in shaft 10 and in grooves or slots 20, 20' and 21 cut in the outer tubular shaft 12 and held in place by a retainer or carrier ring 16 which holds the balls 14 in position in the slots or grooves in the axis of the shaft 10 and tubular shaft 12. The grooves 18 in shaft 10 are best seen in Fig. 2, and while they are shown of triangular shape they could be of any other shape to fit the balls employed. The flexible fingers, 22 and 22', are best shown in Fig. 4 inclosing and forming grooves 20 and 20' respectively with their points of attachment at opposite ends of tubular shaft 12 at 24 and 24'. A groove 21 is shown without flexible fingers which acts as a reference guide in assembling the drive.

As can be seen from the foregoing description and the drawings, rotary motion of either shaft will be transmitted through the balls to the other and irregularities in the grooves and wear of the parts will be taken up by the flexible fingers anchored at opposite ends of the outer shaft. The even pressure of the flexible fingers forcing the balls into the grooves takes up backlash and offers only the friction of the rolling balls to sliding motion between the shafts. No special precaution in machining the parts is necessary, ordinary machining tolerances being sufficient, thus saving cost of manufacture. Assembly of the drive is simple and incorporation of the invention in the final apparatus requires no special skill or care in alignment.

Having described a preferred embodiment of my invention what I claim as new and pray for a United States patent is:

1. In a universal coupling, a driven member and a driving member, one of said members being provided with at least three axially extending angularly spaced grooves, the other of said members being provided with at least two spring members each having a groove overlying a groove in the other member, and spherical members positioned in each said set of grooves to provide a driving connection between said members and to maintain said two members in spaced radial position, said spring members being effective also to seat said spherical members in said grooves to prevent lost motion therebetween.

2. In a universal coupling, a driving member and a driven member, one of said members surrounding the end portion of the other member, one of said members being provided with at least three axially extending angularly spaced grooves, the other of said members being provided with grooves overlying the grooves in said first member, at least two of said grooves being formed in flexible spring fingers on said other member, and balls positioned in each of said sets of grooves to form a driving connection between said two members, said spring fingers being effective to seat said balls in said grooves and to prevent lost motion between said two members.

3. In a universal type drive coupling the combination of an inner shaft provided with at least three angularly disposed grooves parallel to its axis, an outer tubular shaft with similarly spaced grooves at least two of said grooves being located in flexible fingers formed in said tubular member, balls in said grooves between said inner and outer shafts to transmit rotary motion from one shaft to the other and to permit sliding motion between the said shafts, the said flexible fingers to take up irregularities and wear in said grooves to prevent backlash in the rotary motion.

4. A universal type drive coupling comprising an inner shaft having at least three grooves parallel to its axis, an outer tubular shaft having similarly spaced grooves, balls in said grooves between the said inner and outer shafts to transmit rotary motion from one shaft to the other and permit sliding motion between said shafts, at least two grooves in one of said shafts being formed in flexible fingers to compensate for irregularities in said grooves and take up wear between the parts to prevent backlash in the rotary motion.

5. A universal type drive coupling comprising an inner shaft having at least three grooves parallel to its axis, an outer tubular shaft having similarly spaced grooves, balls in said grooves between the said inner and outer shafts to transmit rotary motion from one shaft to another and permit sliding motion between said shafts, at least two grooves in one of said shafts being formed in flexible fingers exerting pressure on said balls to compensate for irregularities in said grooves and take up wear between the parts to prevent backlash in the rotary motion.

References Cited in the file of this patent

UNITED STATES PATENTS

| | | |
|---|---|---|
| 754,066 | Hoffmann | Mar. 8, 1904 |
| 2,341,947 | Roberts | Feb. 15, 1944 |
| 2,562,729 | Merwin | July 31, 1951 |